US011721306B2

(12) United States Patent
Patel et al.

(10) Patent No.: US 11,721,306 B2
(45) Date of Patent: Aug. 8, 2023

(54) METHOD AND APPARATUS FOR PROVIDING A PICTURE-IN-PICTURE (PIP) OVERLAY WINDOW ON A SINGLE PHYSICAL MONITOR

(71) Applicant: ATI Technologies ULC, Markham (CA)

(72) Inventors: Nitant Patel, Brampton (CA); Parimalkumar Patel, Toronto (CA); Anthony Brown, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/119,360

(22) Filed: Dec. 11, 2020

(65) Prior Publication Data

US 2022/0101814 A1   Mar. 31, 2022

Related U.S. Application Data

(60) Provisional application No. 63/083,385, filed on Sep. 25, 2020.

(51) Int. Cl.
| | | |
|---|---|---|
| G09G 5/377 | (2006.01) | |
| G09G 5/36 | (2006.01) | |
| G06F 3/0482 | (2013.01) | |
| G06F 9/455 | (2018.01) | |
| G06F 3/0484 | (2022.01) | |

(52) U.S. Cl.
CPC ........... *G09G 5/377* (2013.01); *G06F 3/0482* (2013.01); *G06F 3/0484* (2013.01); *G06F 9/45508* (2013.01); *G09G 5/363* (2013.01); *G06F 2203/04804* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 8,884,945 B2 | 11/2014 | Kelly et al. | |
| 2008/0088636 A1* | 4/2008 | Ho | G06F 3/14 345/530 |
| 2011/0144970 A1* | 6/2011 | Jiang | G06F 9/451 715/781 |
| 2011/0173703 A1* | 7/2011 | Kim | H04N 21/41407 726/26 |
| 2013/0310179 A1* | 11/2013 | Kelly | G07F 17/3209 463/37 |

OTHER PUBLICATIONS

DisplayFusion; Multiple Monitors Made Easy; from www.displayfusion.com; Dec. 2020.
Digital Tigers; UltraView Desktop Manager; Advanced Software for Managing Multiple Monitors and Split Screens: Create Personal Productivity Dashboard Via Virtual Monitors; from www.digitialtigers.com/ultraview-desktop-manager.asp; Dec. 2020.

* cited by examiner

*Primary Examiner* — Yi Wang

(57) ABSTRACT

Methods and apparatus provide a picture-in-picture (PIP) overlay window on a single physical monitor by displaying a first swap chain of the single physical monitor, reporting to an operating system (OS), a display level request for a fake connection to a non-existent second monitor, and displaying on the single physical monitor a virtual display defined by a second swap chain of the non-existent second monitor, as the PIP overlay window on the displayed content of the first swap chain on the single physical monitor.

20 Claims, 12 Drawing Sheets

METHOD AND APPARATUS FOR PROVIDING A PICTURE-IN-PICTURE (PIP) OVERLAY WINDOW ON A SINGLE PHYSICAL MONITOR

RELATED APPLICATIONS

This application claims priority to Provisional Application Ser. No. 63/083,385, filed on Sep. 25, 2020, having inventors Nitant Patel et al., titled "METHOD AND APPARATUS FOR PROVIDING A PICTURE-IN-PICTURE (PIP) OVERLAY WINDOW ON A SINGLE PHYSICAL MONITOR", and is incorporated herein by reference.

BACKGROUND OF THE DISCLOSURE

Operating systems (OS) such as Linux and Windows allow users to create multiple virtual desktops. These operating systems allow users to preview the contents of virtual desktops to some extent, however to do so, a user has to typically stop their existing work and explicitly request a preview of the background desktop, making the two activities mutually exclusive. Also, systems do not allow seamless switching between multiple desktops on the fly on a single monitor. In some implementations, an operating system allows a live preview of background videos while a full screen desktop is in use. Although some solutions use the term "virtual display" they do not actually provide a virtual display on a display level basis but instead are limited to displaying in PIP windows only portions of information that can be accommodated with a single primary swap chain as setup by an operating system for the single physical monitor. The background video is typically limited to video playback and employs the single primary swap chain for the physical monitor. For example, the live preview of background video which appears in a picture-in-picture (PIP) overlay window appears to employ a software composite onto a single primary swap chain for the physical monitor. As such, the picture-in-picture overlay typically does not capture a whole primary surface in the picture-in-picture window. Existing multi-desktop solutions for use on a single monitor have limitations that make them impractical for day to day use.

BRIEF DESCRIPTION OF THE DRAWINGS

The implementations will be more readily understood in view of the following description when accompanied by the below figures, wherein like reference numerals represent like elements, and wherein.

Figure 1:
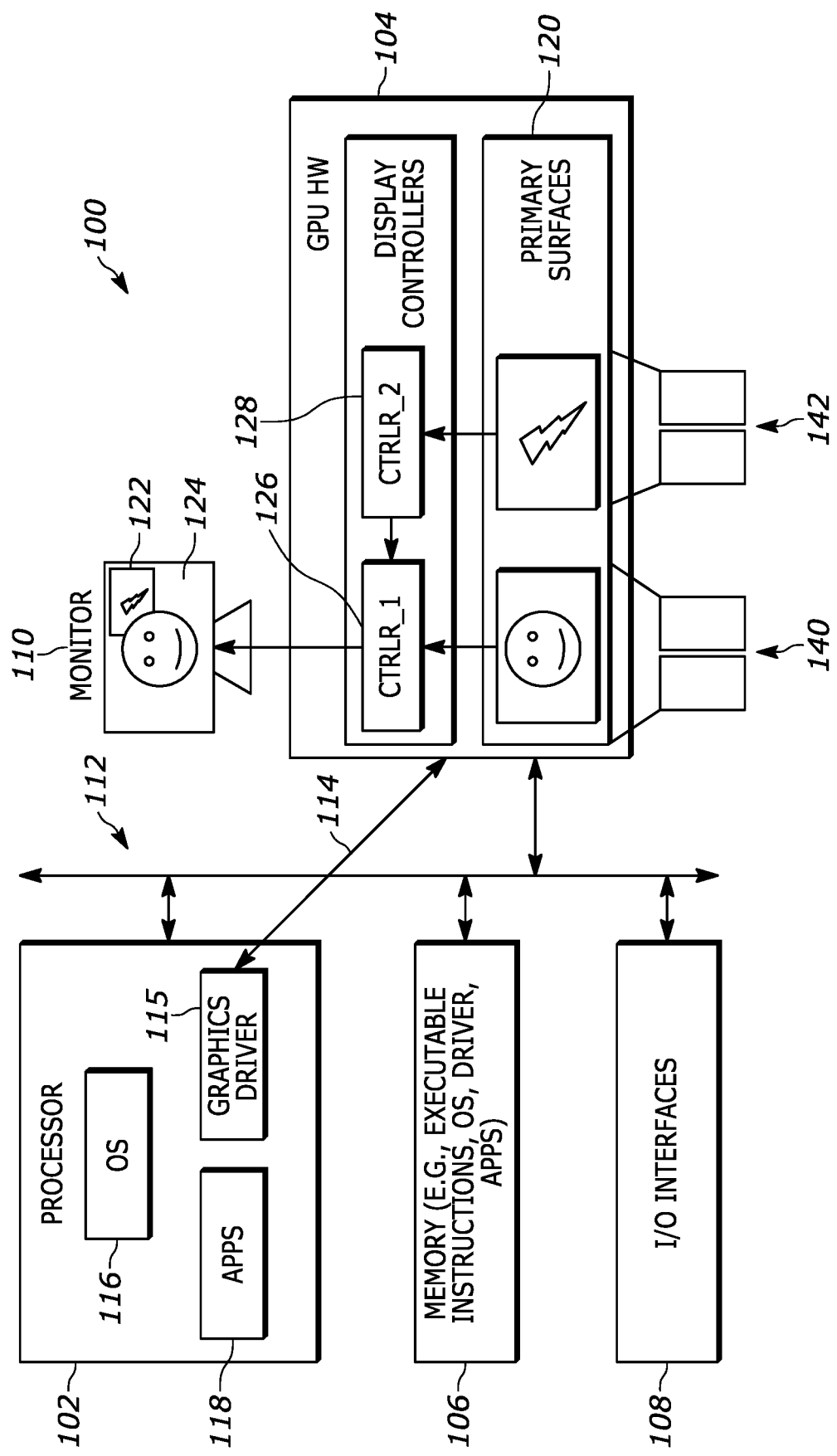
FIG. 1 is a block diagram illustrating one example of an apparatus for providing a picture-in-picture overlay on a single monitor in accordance with one example set forth in the disclosure.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

In some implementations, methods and apparatus emulate a multi-monitor experience by creating one or more virtual displays to emulate the presence of a physical display on a single physical monitor. In some implementations, the presence of one or more non-existent physical monitors is simulated on a single physical monitor. In some implementations, an always-available live preview is provided of the contents being displayed in the virtual display as an overlay on top of a physical display's desktop. In some implementations, a quick switch between the primary swap chains of a physical monitor and virtual display is provided without operating system awareness.

In certain implementations, a method for providing a picture-in-picture (PIP) overlay window on a single physical monitor includes displaying, such as by a graphics driver, content of a first primary swap chain of the single physical monitor, reporting, by the graphics driver to an operating system (OS), a display level request for a fake connection to a non-existent second physical monitor, and displaying on the same physical monitor, such as by the graphics driver, a virtual display defined by a second primary swap chain of the non-existent second monitor, as a PIP overlay window on the displayed content of the first primary swap chain on the single physical monitor.

In some examples, the method includes creating the virtual display by reporting the display level request for the fake connection to the non-existent second monitor in response to receiving input to create the virtual display, receiving emulated display configuration requests from the OS for the non-existent second monitor in response to the display level request for the fake connection, providing emulated display configuration information regarding the non-existent second monitor to the operating system for creation of the second primary swap chain by the driver, and receiving a request for the second swap chain from the OS for the virtual display.

In certain examples, providing the displayed virtual display includes providing a live view of entire content of the second primary swap chain for the non-existent monitor as a scaled down overlay window on top of content displayed from the first primary swap chain of the single physical monitor. In some examples, the method includes dynamically switching, without knowledge of the OS, content between the first primary swap chain and the second primary swap chain, based on user input.

In certain examples, the method includes intercepting, such as by the graphics driver, display level primary surface flipping instructions from the operating system for the non-existent second monitor and emulate responses to the surface switching instructions. In some examples, the method includes providing, such as by the graphics driver, an emulated vertical synchronization interrupt in response to a detected scanout of the second primary swap chain to the single physical monitor.

In certain examples, the method includes providing a user interface comprising one or more selectable user controls that allow at least one of: enablement of the virtual display PIP overlay window, transparency level changes of the PIP overlay window and switching of content between the first and second primary swap chains.

In some implementations, an apparatus for providing a picture-in-picture overlay on a single monitor includes memory that stores executable instructions that define an operating system and a graphics driver, at least one processor that executes the stored instruction defining the operating system and the graphics driver. The apparatus includes a graphics processor and the processor executes graphics driver code that causes the display of content of a first primary swap chain of the single physical monitor, reports to an operating system (OS) a display level request for a fake connection to a non-existent second monitor, and displays on the single physical monitor a virtual display defined by a second primary swap chain of the non-existent second monitor, as a PIP overlay window on the displayed content of the first primary swap chain on the single physical monitor.

In certain examples, the apparatus includes a first display controller that outputs the first primary swap chain for display on the single monitor, and a second display controller outputs the second primary swap chain for display on the single monitor.

In some examples, the graphics driver creates the virtual display by reporting the display level request for the fake connection to the non-existent second monitor in response to receiving input to create the virtual display, receives emulated display configuration requests from the OS for the non-existent second monitor in response to the display level request for the fake connection, provides emulated display configuration information regarding the non-existent second monitor to the operating system for creation of the second primary swap chain by the driver, and receives a request for the second primary swap chain from the OS for the virtual display.

In certain examples, the graphics driver provides a live view of entire content of the second primary swap chain for the non-existent monitor as a scaled down overlay window on top of content displayed from the first primary swap chain of the single physical monitor. In some examples, the graphics driver dynamically switches, without knowledge of the OS, content between the first primary swap chain and the second primary swap chain, based on user input.

In certain examples, the graphics driver intercepts display level primary surface flipping instructions from the operating system for the non-existent second monitor and emulate responses to the surface switching instructions. In some examples, the graphics driver provides an emulated vertical synchronization interrupt in response to a detected scanout of the second primary swap chain to the single physical monitor.

In certain examples, the graphics driver, application or the mechanism provides a user interface that includes one or more selectable user controls that allow at least one of: enablement of the virtual display PIP overlay window, transparency level changes of the PIP overlay window and switching of content between the first and second primary swap chains.

In some implementations, a non-transitory storage medium stores executable instructions that when executed by one or more processors causes the one or more processors to operate as a graphics driver that displays content of a first primary swap chain of a single physical monitor, reports to an operating system (OS) a display level request for a fake connection to a non-existent second monitor, and displays on the single physical monitor a virtual display defined by a second primary swap chain of the non-existent second monitor, as a PIP overlay window on the displayed content of the first primary swap chain on the single physical monitor.

In certain examples, the non-transitory storage medium stores executable instructions that when executed by one or more processors causes the one or more processors to operate as a graphics driver that reports the display level request for the fake connection to the non-existent second monitor in response to receiving input to create the virtual display, receives emulated display configuration requests from the OS for the non-existent second monitor in response to the display level request for the fake connection, provides emulated display configuration information regarding the non-existent second monitor to the operating system for creation of the second primary swap chain by the driver, and receives by the graphics driver a request for the second primary swap chain from the OS for the virtual display.

In some examples, the non-transitory storage medium stores executable instructions that when executed by one or more processors causes the one or more processors to operate as a graphics driver that dynamically switches, without knowledge of the OS, content between the first primary swap chain and the second primary swap chain, based on user input.

In certain examples, the non-transitory storage medium stores executable instructions that when executed by one or more processors causes the one or more processors to operate as a graphics driver that intercepts display level primary surface flipping instructions from the operating system for the non-existent second monitor and emulate responses to the surface switching instructions.

In some examples, the non-transitory storage medium stores executable instructions that when executed by one or more processors causes the one or more processors to operate as graphics driver that provides a user interface comprising one or more selectable user controls that allow at least one of: enablement of the virtual display PIP overlay window, transparency level changes of the PIP overlay window and switching of content between the first and second swap chains.

Certain terminology used herein will be summarized as follows: monitor—an output device that presents pixel information; primary surface—an area of memory (e.g., a buffer) that contains pixel data that can be scanned by display hardware and output to a monitor; primary swap chain—a set (typically 2-3) of buffers (e.g., front buffer and back buffers) wherein each buffer corresponds to a primary surface that is created and managed by the same application. While one buffer is for onscreen, the application draws to another buffer that is offscreen. The primary swap chain is scanned by display hardware and output to a monitor; swapping/flipping—the act of presenting a new frame onscreen by swapping the onscreen buffer with a fully-drawn offscreen buffer; desktop—the conceptual source of the swap chain content. Typically, a full-screen application or the operating system's window manager. A desktop is typically associated with one or more displays; virtual display (VD)—a display that is emulated by the graphics driver, despite the absence of a physical monitor; virtual desktop—a desktop associated with a virtual display; overlay—a (optionally semi-transparent) window shown "on top" of another desktop; GPU—Graphics Processing Unit. Component of the computer responsible for rendering and displaying content; Graphics Driver—one or more processors executing software loaded and used by the operating system to interact with a GPU. Graphics driver code is stored executable instructions that when executed by one or more processors causes the processor to perform as a graphics driver; Kernel Mode Graphics (KMD) Driver—module of the graphics driver that has elevated privilege and interacts directly with the GPU hardware; operating system (OS)—a system software that manages interaction between applications and hardware by handling tasks related to file, memory, process, input-output and peripheral hardware devices (printer, GPU, network device etc.); User Mode Driver (UMD)—module of the graphics driver that has less privilege than KMD and enables applications to interact to GPU hardware via OS and KMD; VSYNC interrupt—Periodic notification generated by a display upon each complete "refresh" (i.e., every time it has scanned and presented an entire primary surface); and HPD—Hot plug Detection; EDID—Extended Display Identification Data. A metadata format for display devices to describe their capabilities to a graphics processing unit (GPU).

FIG. 1 illustrates one example of a computing device 100 that includes one or more processors 102, one or more graphics processing units 104, memory 106, input/output interfaces 108 and a single physical monitor 110. The computing device 100 may be any suitable apparatus including, but not limited to, laptop computer, tablet, smart phone, desktop computer, wearable device or any other suitable device. The single physical monitor 110 as such may be integrated in a housing of the device, may be separate from the device, may be a projector connected to the device or in in any other suitable configuration. The components are interconnected through known communication links as generally shown by arrows which represent buses 112. Arrow 114 illustrates a graphics driver 115 that communicates with the graphics processing unit 104. The processor 102 in one example is a central processing unit (CPU) that includes one or more processor cores and executes executable instructions (i.e., stored code) that are stored in non-transitory memory 106 such as RAM, ROM or any other suitable memory. The memory 106 in this example stores code configured as an operating system 116, the graphics driver 115 applications 118, or any other suitable executable code. The processor 102 is shown as serving as the operating system 116, the application 118 executer as well as the graphics driver 115. However, it will be recognized that the various components may be executed by any suitable processing device. In one example, the processor 102 and graphics processing unit 104 are integrated in a system on-chip. However, any suitable configuration may be employed.

As shown, a graphics processing unit 104 includes memory 120, such as frame buffer memory. In this example, the graphics driver 115 in combination with the graphics processing unit 104 provides a multi-tasking solution that emulates a multi-display experience on a single physical monitor, without the need for additional monitors. The graphics driver 115 creates a virtual display 122 that is displayed on the single physical monitor 110 in combination with a main display 124 which in one example can be a full-screen application, operating system desktop, or any other image that results from the graphics processor outputting frames of pixel information from a primary swap chain defined for the physical monitor 110.

The graphics processing unit 104 includes a plurality of display controllers 126 and 128 (e.g., display engines that have overlay capability). One example of the graphics processing unit 104 is a Radeon RX 5700 Series graphics processor sold by Advanced Micro Devices, Santa Clara, Calif. However, any suitable graphics processing unit may be employed. In this example, the graphics driver 115 makes use of multi-plane overlay hardware of the display controllers 126 and 128.

The graphics processing unit 104 employs different display controller 126 and 128 which facilitates overlaying and blending a "window" as an inset on top of the main display 124 such as a full screen desktop or non-full screen desktop. For example, the virtual display 122 includes the entire contents of a virtual desktop that uses a swap chain 142 dedicated to the virtual display 122 on top of the main display 124 (e.g., physical display's desktop). The primary swap chain 142 is flipped independently from the primary swap chain 140 of the physical monitor 110. In some implementations, the overlay window transparency is also programmable. In certain implementations, the position of the overlay window is programmable. In certain implementations, the size of the overlay window is programmable and the user continues interacting with the main display 124 (e.g., desktop) beneath the overlay window while the overlay window displays a live view of an entire content of the primary swap chain 142 as a scaled down overlay window on top of the content displayed from the first primary swap chain 140 of the single physical monitor. Unlike other picture-in-picture systems, the virtual display 122 has a picture-in-picture overlay window that has its own primary swap chain defined as those of a complete and independent physical monitor by the operating system.

Normally, when a display is plugged into a graphics card, the graphics driver queries the properties and capabilities of that display and forms a software abstraction of the display hardware (e.g., what type of connector, what resolution are supported, what refresh rates the display is capable of, and other operational characteristics). The operating system, in turn, queries the graphics driver and forms its own software abstraction of the display. Unlike normal systems however, the graphics driver 115 as described herein decouples the software abstraction from the display hardware. The graphics driver 115 artificially generates a simulated software abstractions of a non-existent physical display, without the operating system's knowledge. Applications, user mode drivers, and the operating system, interface with the virtual display as they would with a physical display, with the graphics driver 115 emulating all responses that would normally require interaction with a second physical display. As such, a virtual display is enabled and the operating system is faked into creating a corresponding virtual display that includes a virtual desktop by requesting the graphics driver to create a primary swap chain for the virtual display. As such, in some implementations, the graphics driver receives a request to create a primary swap chain for a non-existent physical display from the operating system.

Figure 2:
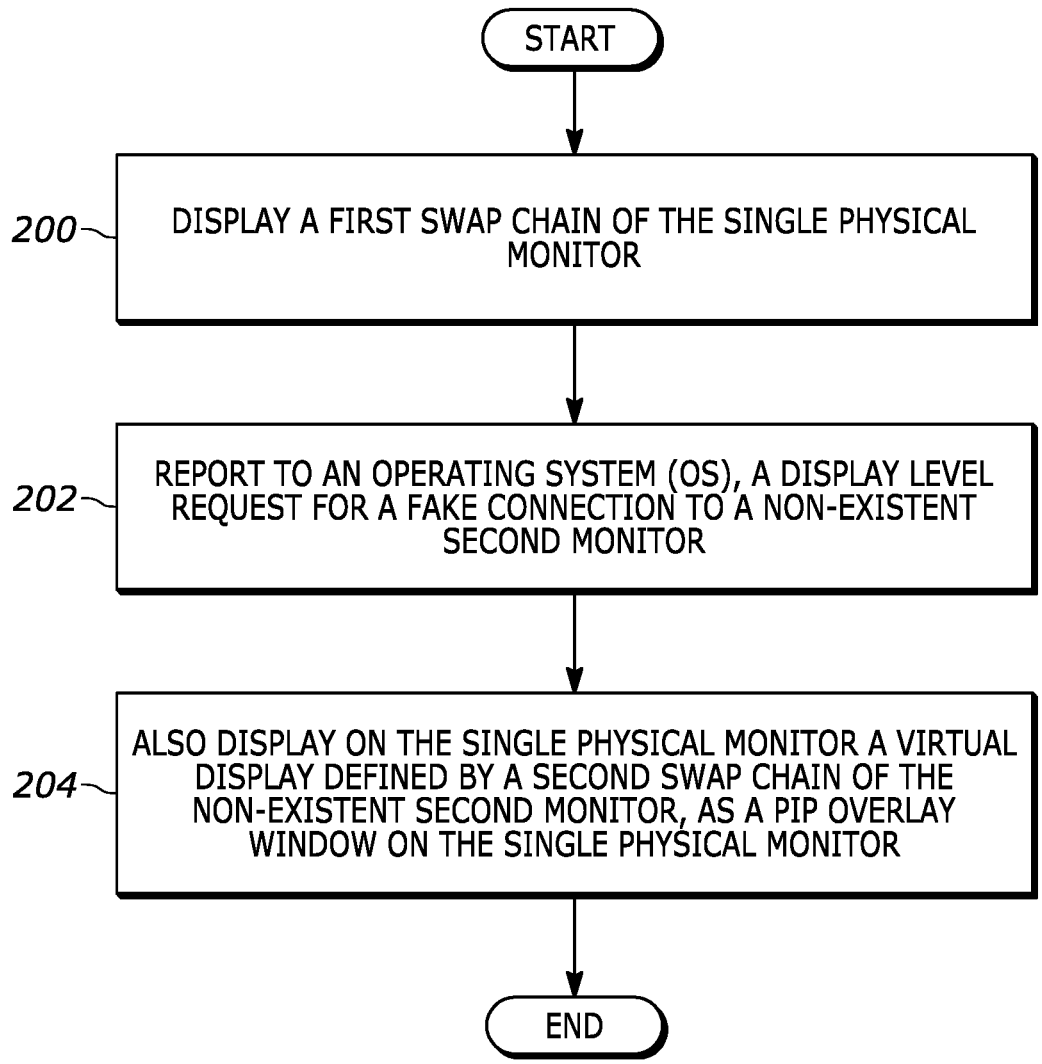
FIG. 2 is a flowchart illustrating a method for providing a picture-in-picture overlay on a single physical monitor in accordance with one example set forth in the disclosure.

Referring also to FIG. 2, a method for providing a picture-in-picture overlay window on the single physical monitor 110 is illustrated. It will be recognized that the operations may be performed in any suitable order. In this example the operations are performed by the graphics driver 115. As used herein, graphics driver 115 will be described as the processor 102 executing stored code that operates as the graphics driver 115. As shown in block 200, the method includes displaying a first primary swap chain of the single physical monitor. For example, when the single physical monitor 110 is initially connected to the graphics processor 104 as noted above, the operating system 116 queries the graphics driver 115 regarding the details of the physical monitor 110 through, for example, EDID communications or any other mechanism. As such, a monitor connection request is sent by the graphics driver 115 to the operating system 116. The operating system 116 queries the graphics driver 115 using known techniques to obtain the configuration and capability information from the single physical monitor 110. The operating system 116 also creates requests driver to create for a given applications or set of applications, a primary swap chain shown as 140 corresponding to the single physical monitor 110. The primary swap chain 140 is a set of buffers that are managed by the application and contain the pixel information that is scanned out by display controller 126 on a frame basis on-screen. For example, if an application is a gaming application, the application draws to a on screen off-screen buffer of the swap chain that is then swapped on screen and read by the display controller 126 and then application continues writing another frame to the backup buffer (offscreen buffer) as the on-screen buffer is being read for display on the single physical monitor 110. A primary surface is an area of memory that contains the pixel data that can be scanned by the display hardware 104 and output to the monitor.

As shown in block 204, to create the virtual display 122, the graphics driver 115 reports to the operating system 116 a display level request for a fake connection to a non-existent second monitor. Stated another way, the graphics driver 115 informs the operating system 116 that there has been a new physical display connected when in fact no new physical display exists. In response, the operating system 116 defines a second primary swap chain 142 associated with the virtual display 122. As shown in block 206, the method includes displaying on the single physical monitor 110, the virtual display 122 in combination with the main display 124. The virtual display 122 (also referred to as a virtual monitor) as defined by the second primary swap chain 142 of the non-existent second monitor, is a picture-in-picture overlay window on the single physical monitor 110. As such, the virtual display 122 which is a picture-in-picture overlay window has all of the characteristics of another physical display but is presented as an overlay window on the single physical monitor 110. The operating system 116 is tricked into creating, in this example, two separate primary swap chains for the same single physical monitor 110 The GPU displays two swap chains on same single physical monitor. As such, the operating system 116 is tricked into creating, in this example, two separate primary swap chains which will both be displayed on same single physical monitor 110. If additional virtual displays are desired, additional primary swap chains are generated through the graphics driver issuing fake connection requests of nonexistent monitors to the operating system. The graphics driver manages the swap chains as further described herein.

Figure 3:
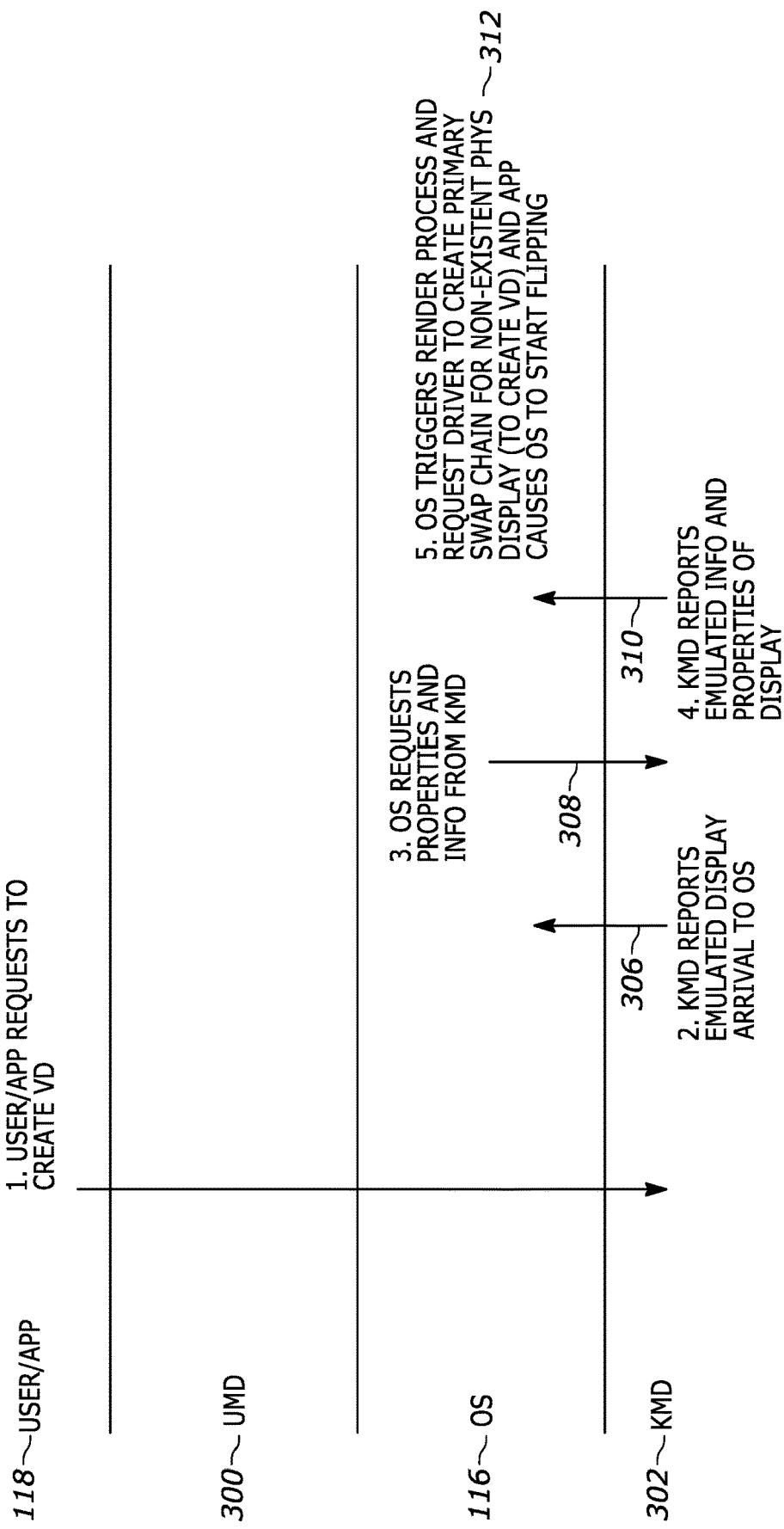
FIG. 3 is a communication diagram illustrating communication between a user interface or application operating system and graphics driver in accordance with one example set forth in the disclosure.
Figure 4:
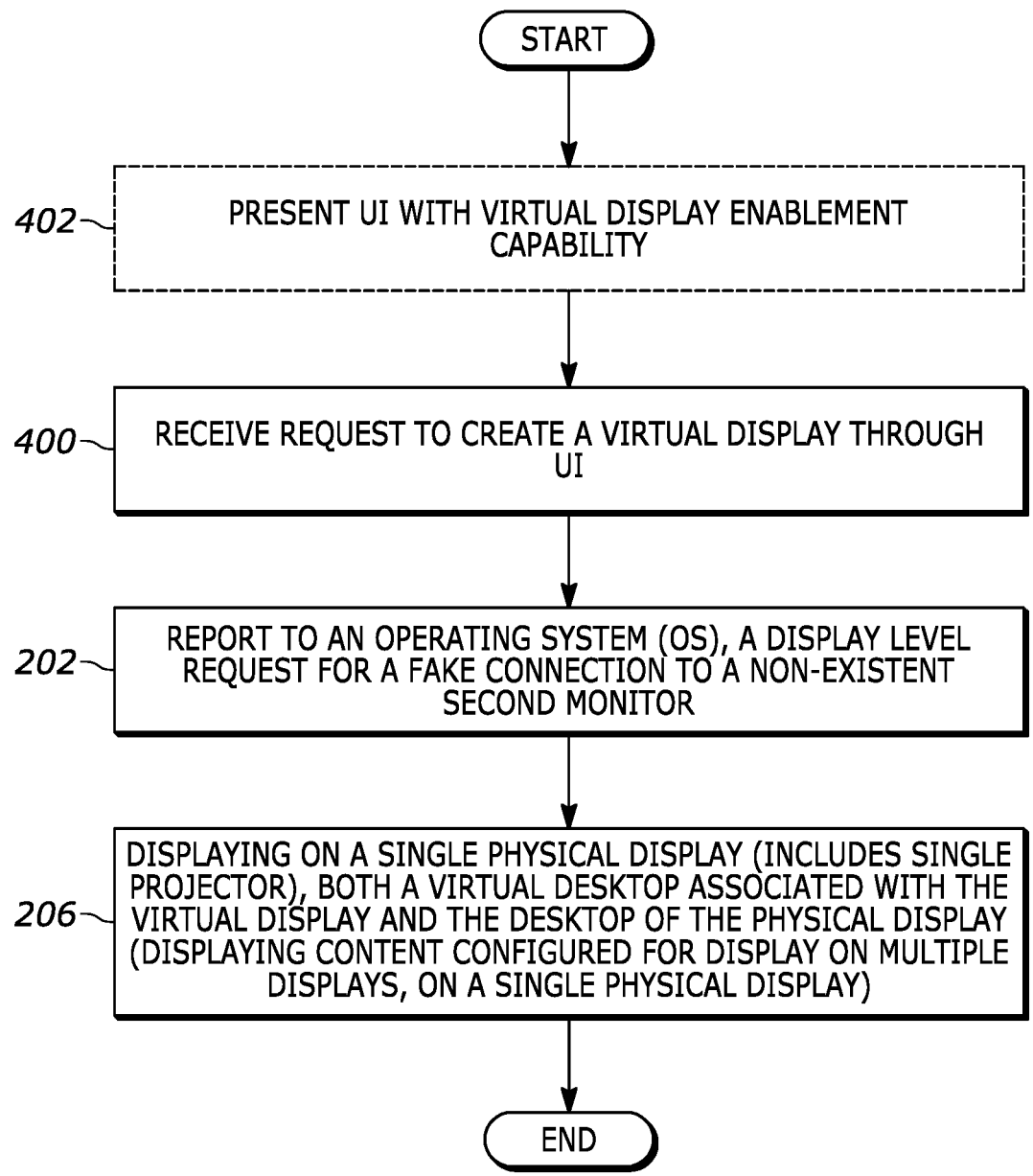
FIG. 4 is a flowchart illustrating a method for providing a picture-in-picture overlay on a single physical monitor in accordance with one example set forth in the disclosure.

Referring to FIGS. 3-5, a description of the operation of the device 100 will be described in more detail. In one example, the graphics driver 115 is divided into a user mode driver (UMD) 300 which is a module of the graphics driver 115, that has less privilege than a kernel mode graphics driver (KMD) 302. The user mode driver 300 enables applications to interact with GPU hardware via the operating system 116 and the kernel mode graphics driver 302. The kernel mode graphics driver 302 is a module of the graphics driver 115 that has elevated privilege and interacts directly with the GPU hardware, namely the graphics processing unit 104. As represented by line 304 and block 400, the method for providing a picture-in-picture overlay window in this example includes receiving a request to create a virtual display. In some examples, a user interface application allows a user to select creation of the virtual display along with other parameters as desired through a user interface (see e.g., FIG. 6). In other implementations, the request is generated by an application that has been selected to run such that the application automatically requests that it be presented as a virtual display. The request is provided to the kernel mode graphics driver 302. As shown by line 306, the KMD reports 302 to the operating system 116 a display level request for a fake connection to a nonexistent second monitor. As such, the method includes reporting 202 the display level request for the fake connection to the nonexistent second monitor in response to receiving input to create the virtual display. As noted, the input to create the virtual display may be user input, or may be embedded in an application or any other suitable mechanism. As shown with line 308, the method includes receiving by the graphics driver (e.g., the KMD 302) display configuration requests from the operating system for the nonexistent second monitor in response to the display level request for the fake connection. As shown by line 310, the method includes providing by the graphics driver, such as the KMD 302 to the operating system, emulated display configuration information regarding the nonexistent second monitor for creation of the second primary swap chain 142 by the operating system 116. For example, the KMD 302 sends fake EDID information such as the same resolution as the single physical monitor 110, same refresh rates as the single physical monitor, and mode enumeration information to force the operating system 116 to request driver to create the primary swap chain 142 for a second physical monitor that does not exist. Mode enumeration is a process of telling the OS various capabilities of displays that are connected (e.g., timings, resolutions, rotations, scaling and other information that the display can support). However different information from the physical monitor can be used as well. As shown by line 312, the method includes receiving the second primary swap chain designation from the OS for the virtual display on the single physical monitor. The OS requests that the driver create the primary swap chain for the non-existent physical display. In one example, the desktop windows manager (DWM) or full screen application that is running on that display will request the driver to create the swap chain. The swap chains are created (e.g., memory is allocated by the graphics driver as a primary swap chain for the virtual display) in response to the request from the OS.

In one example, the emulated display configuration information is provided through a user interface when defining the virtual display parameters. In other examples, the graphics driver reads stored EDID information from the physical monitor As shown by dashed box 402, where a user interface is presented to the user. The method includes presenting a user interface that includes one or more selectable user controls. In one example, the one or more selectable user controls allow the enablement of the virtual display PIP overlay window to be generated (see FIG. 6). The user interface may also have a selectable user control that allows the controlling of transparency level changes of the PIP overlay window and switching of content between the first and second primary swap chains 140 and 142 where, for example, the content that is in the virtual display is enlarged to be viewed as the main display 124 and the content that was in the main display 124 is placed in the smaller virtual display 122 that is shown as a PIP overlay window.

To display the virtual display 122 that is defined by the second swap chain 142 of the nonexistent second monitor as a PIP overlay window, in one example, for each new frame, the driver 315 redirects the operating system's request to "flip" for the virtual display, to an overlay operation on the physical display. The operating system 116 believes that a new monitor has been connected when in fact it has not been so the driver 115 remaps the operating system requests that are provided to control the display controllers 128 display the virtual desktop as an overlay image over the main view of the physical display. Stated another way, the method includes intercepting, by the graphics driver, display level primary surface flipping instructions from the operating system for the nonexistent second monitor and emulate responses to the surface switching instructions. For example, when the operating system indicates to perform a flip operation, the address that is provided by the operating system is used instead by the graphics driver to control the display hardware 128 to display the content at the address in a PIP window in this example.

As such, as shown in FIG. 3, the virtual display 122 is created, for example, by a user enabling the virtual display and through user input, the kernel driver is asked to create a virtual display. Upon receiving the request to create a virtual display, the kernel driver 302 notifies the operating system 116 by issuing a display level request for a fake connection to a nonexistent new physical monitor. When the operating system starts querying for the non-existent new physical monitor's properties, such as through EDID communications, such as whether the monitor is HPD capable, monitor resolution, refresh rate, co-functionality with other available displays and other information, the KMD 302 provides emulated information in return. From the perspective of the operating system 116, the operating system 116 believes that a new physical display has been connected when in fact only a single physical display is employed. Once the operating system 116 has all the emulated information regarding the nonexistent new monitor, the operating system requests the graphics driver to create a primary swap chain for the non-existent physical monitor and begins the rendering and flipping of primary surfaces. The kernel mode driver 302 intercepts and emulates responses to these requests as needed.

In some implementations, the graphics driver 115 provides an emulated vertical synchronization interrupt in response to a detected scan out of the second swap chain 142 to the single physical monitor. For example, if a true physical additional monitor was connected, the new physical monitor hardware generates a vertical synchronization (vsync) interrupt upon scan out of the pixel information from its primary swap chain, however since no additional physical monitor is actually connected, the driver 115 generates the vsync interrupt upon each completed scan out using a periodic timer such as a software timer that is monitored by the graphics driver. However, a physical counter may be employed or other suitable mechanism.

FIG. 5 illustrates the computing device 100 starting with a single physical monitor setup. The operating system 116 requests driver to creates the swap chain 140 for the single physical monitor 110 which displays the primary surface 500 using display controller 126. The display controller 126 scans the primary surface from the swap chain 140 to display the primary surface on the monitor as main display 124. As shown in FIG. 5B, when the user creates or an application creates a virtual display, the operating system 116 is faked into creating an additional swap chain 142 for non-existent physical monitor. The operating system 116 associates the primary surface 502 with the virtual display 122. As shown in FIG. 5C, the controller 128 is used by the graphics driver 115 to define the location and size of an overlay window 121 for the virtual display 122 on top of existing content (i.e., main display 124) on the single physical monitor 110. As shown in FIG. 5D, the controller 128 scans the physical surface 502 that is in the primary swap chain 142 to the overlay window to create the virtual display 122.

Figure 5A:
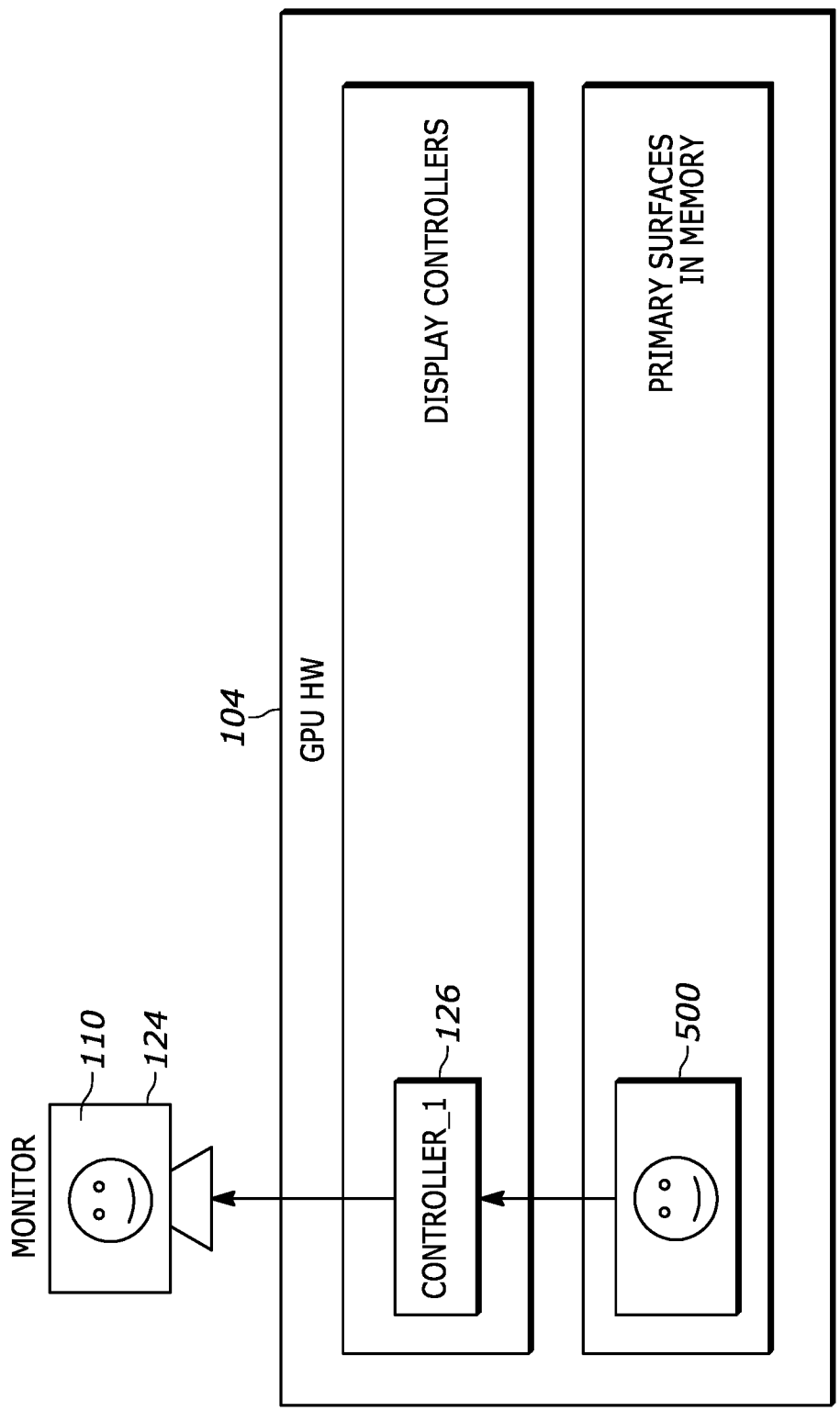
FIGS. 5A-5E are diagrams illustrating operations in a method for providing a picture-in-picture overlay window in accordance with one example set forth in the disclosure.
Figure 5B:
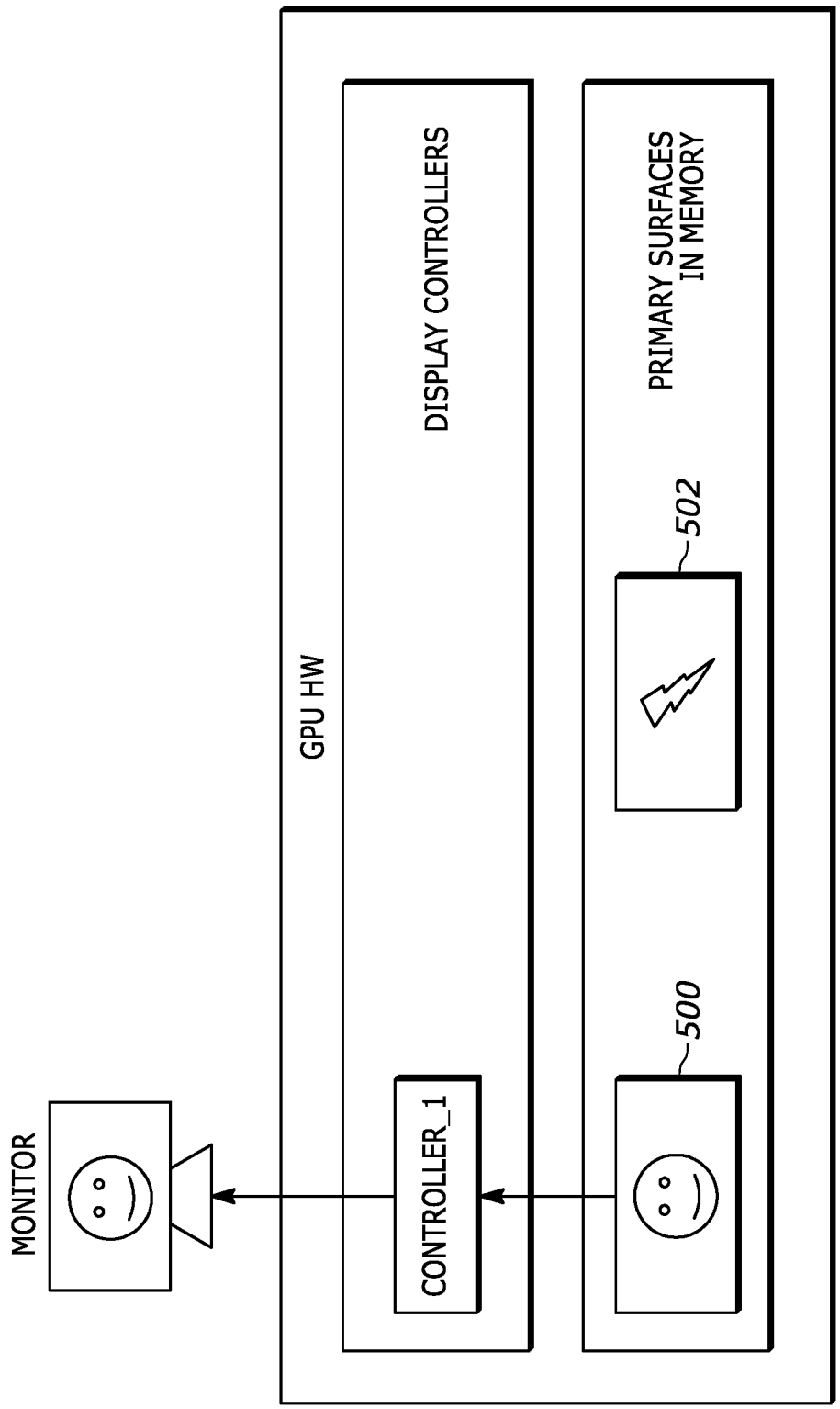
Figure 5C:
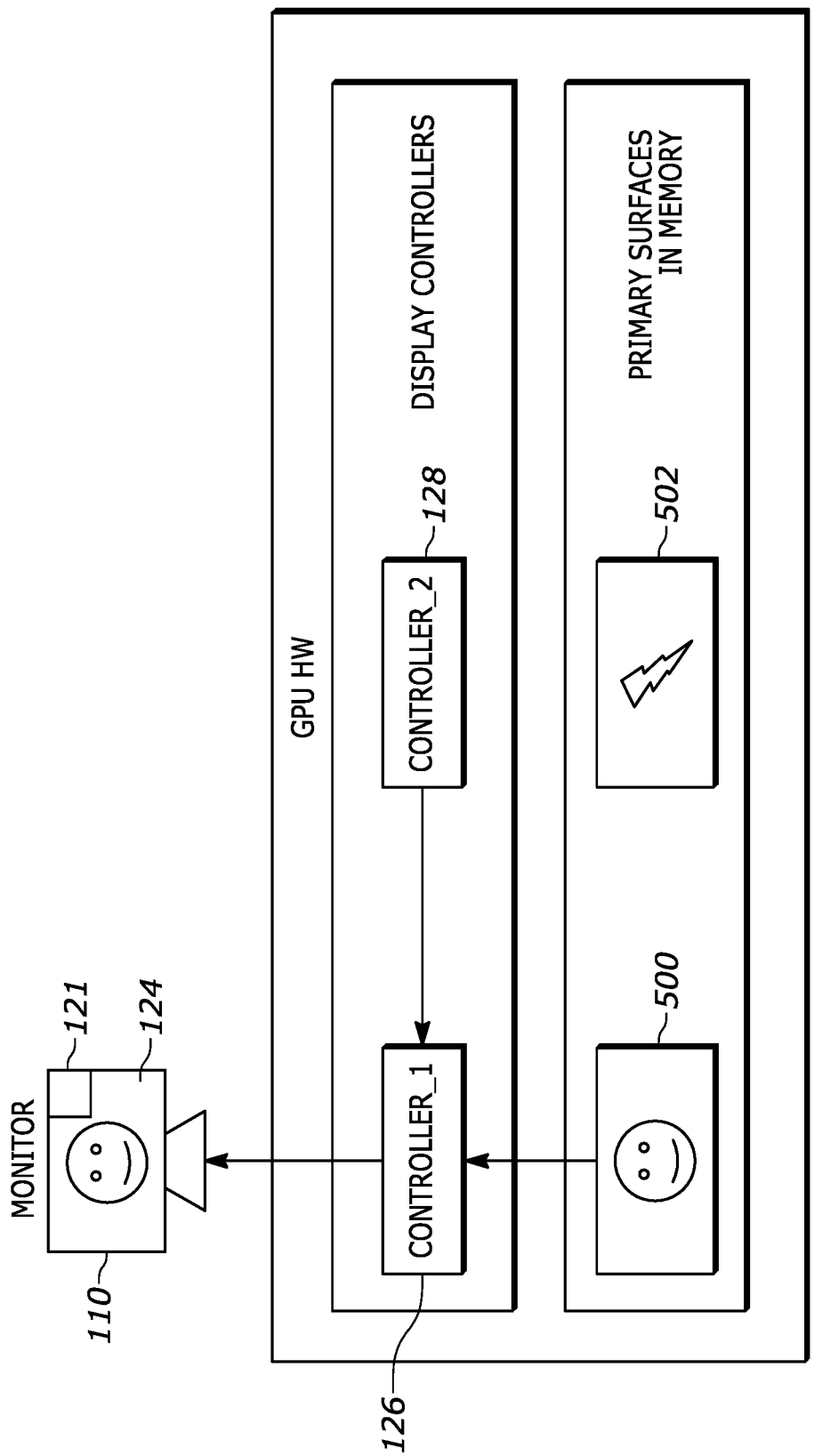
Figure 5D:
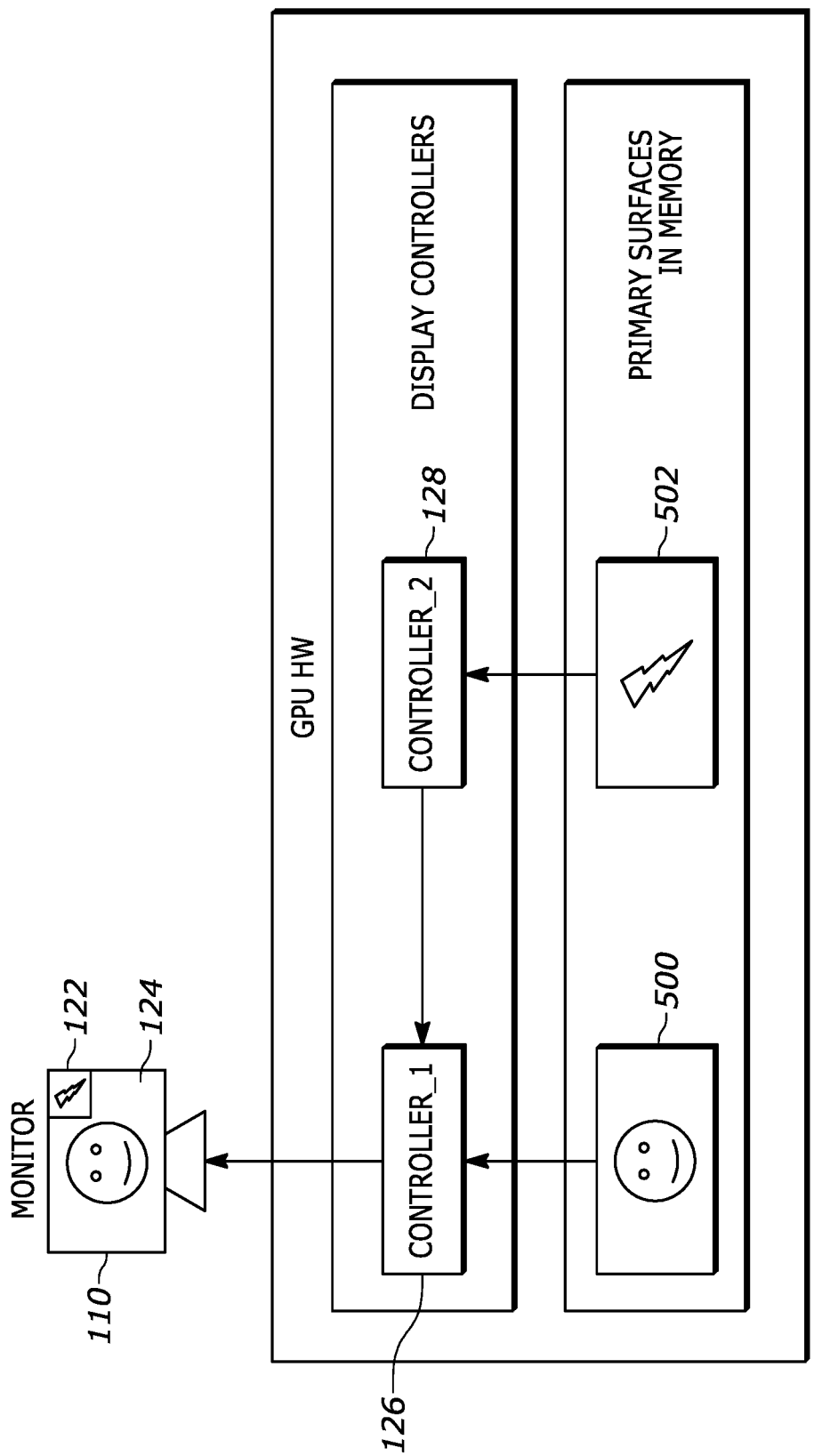
Figure 5E:
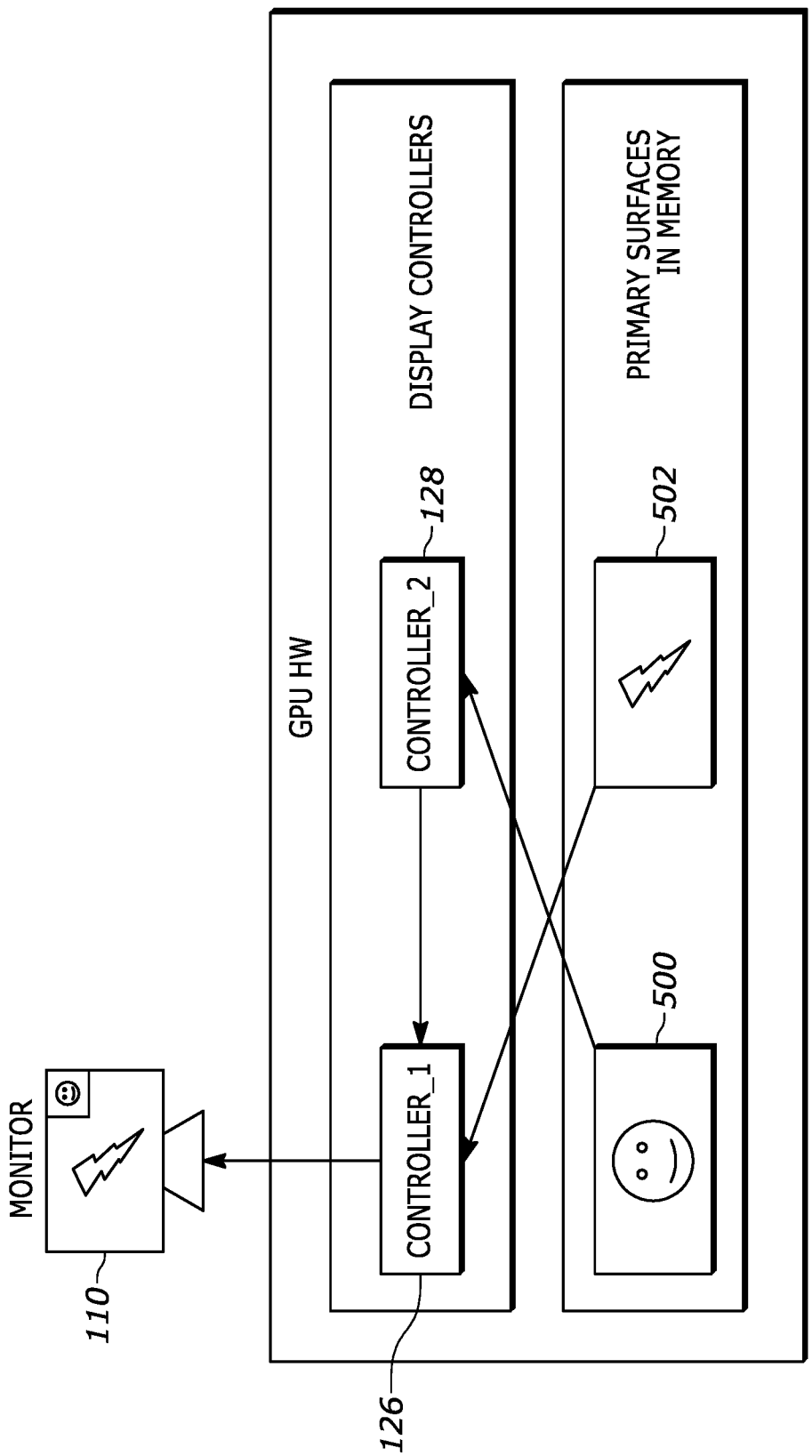

FIG. 5E illustrates the operation of dynamic switching of content between the two swap chains. By way of example, a user may activate a hot key, button in a graphics user interface or other trigger mechanism to activate a dynamic switching of content which makes, in one example, controller 126 scan the primary surface 502 of the primary swap chain 142 that originally was associated with the virtual display and have controller 128 scan primary surface 500 through use of the primary swap chain 140 that was originally associated with the physical monitor 110. As such, the graphics driver 115 provides dynamic switching, without knowledge of the operating system, of content between one primary swap chain and another primary swap chain. For example, in some implementations, a user activates a hot key without knowledge of the operating system or with indication through a user interface provided by the driver or application so that the operating system is not aware of a swap request. The graphics driver 115 keeps track of the surfaces 500 and 502 and which surface gets scanned by which controller that generate the PIP window. As such, no flickering occurs when the swap occurs and a display controller is controlled to scan the swap chain of the other display controller. As shown in FIG. 5E also, the displayed virtual display provides a live view of the entire content of the primary swap chain 142 of the nonexistent monitor as a scaled down overlay window on top of content display from the primary swap chain 140 designated for the single physical monitor.

Figure 6:
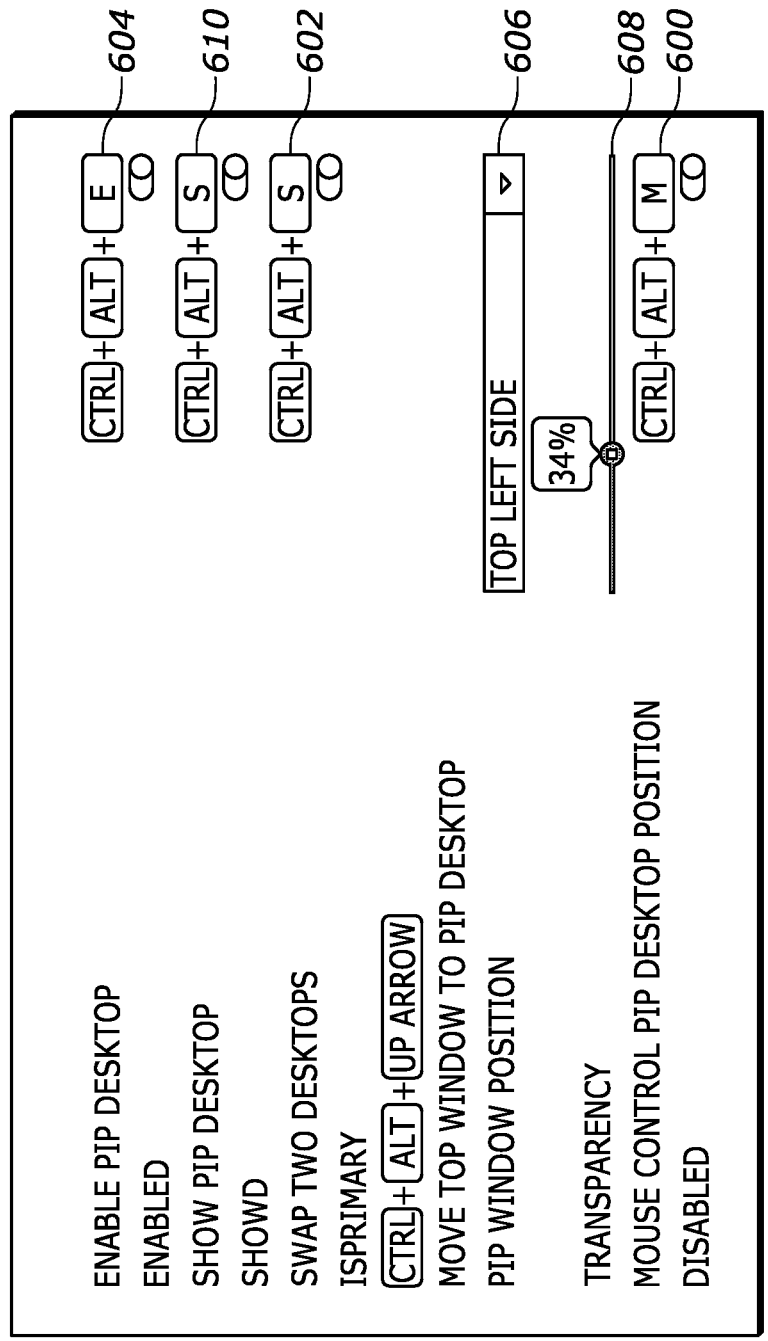
FIG. 6 is a diagram illustrating one example of a user interface in accordance with one example set forth in the disclosure.

FIG. 6 illustrates an example of a graphics user interface that is provided by the graphics driver in one example, by a tool kit application in another example or other mechanism and illustrates the processor 102 providing a user interface that includes one or more selectable user controls. In some implementations, a user interface such as a control panel, such as that shown in FIG. 6, is used to allow a user to create the virtual display. Any other request mechanism may also be employed. In this example, the user through a user interface activates a selectable button, for example, to indicate that a virtual display is to be created. For example, a transparency level control 600 allows the user to adjust the transparency level of the picture-in-picture overlay window. Another user control 602 allows switching of content between the first and second primary swap chains and another user control 604 allows the enablement of the virtual display PIP overlay window. Another control 606 allows the selection of the location of the PIP window. Another control 608 allows the movement of the PIP window through mouse control. Control 610 dynamically switches the content being displayed on physical monitor. For example, the content from the swap chains are scanned so that the content from the PIP window is displayed in the main view and the content from the main view is displayed in the PIP window.

Figure 7:
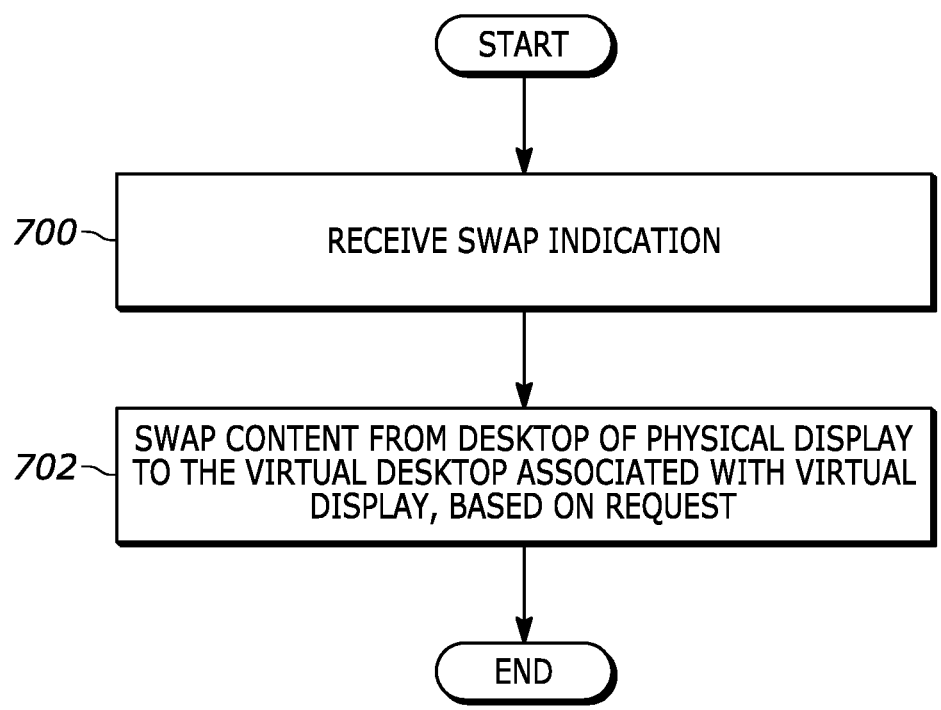
FIG. 7 is a flowchart illustrating a method for providing a picture-in-picture overlay on a single physical monitor in accordance with one example set forth in the disclosure.

FIG. 7 illustrates one example of a method for providing a picture-in-picture overlay window swap between a primary swap chain of a nonexistent second monitor and a primary swap chain of an existing physical monitor. As shown in block 700, the method includes receiving a swap indication, such as through selectable user control 602. The graphics driver 115 controls the display controllers 126 and 128 to display data from the differing swap chains based on the request. As such, the method includes swapping content from, for example, main display for a physical display to a virtual display 122 based on a request. In one example, the kernel graphics driver is aware of the addresses of the primary surfaces in the GPU memory 120. The kernel driver 302 is aware of the association between each primary surface and display controller that is scanning that primary surface from respective swap chains. The kernel driver manipulates any of the operating system's flip requests and redirects a particular primary surface through either the displayed in full screen or the overlay window. This is done without the operating system's knowledge by emulating the appropriate signals and responses as needed. There is no need to perform a copy or incur any software overhead.

Figure 8:
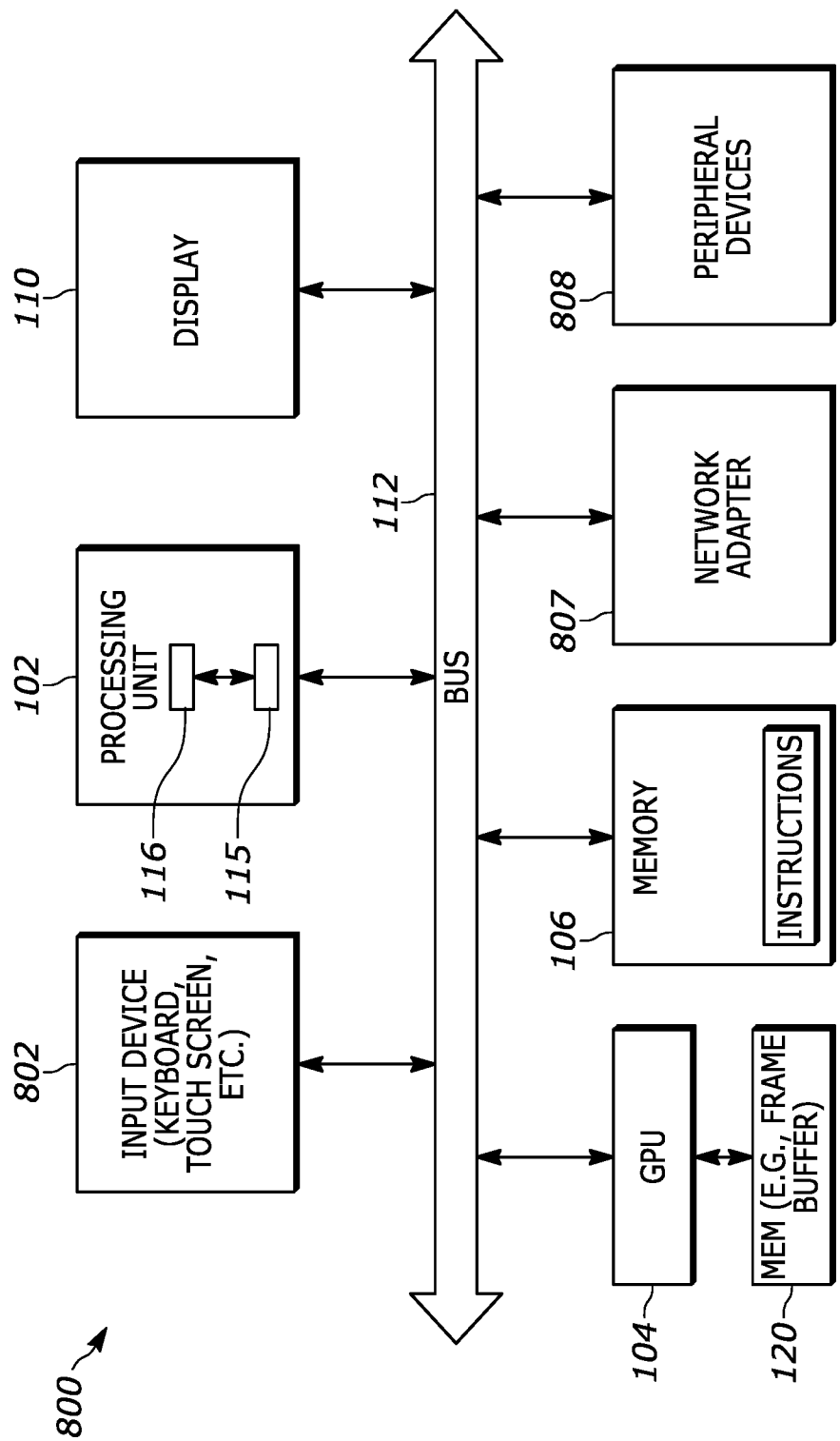
FIG. 8 is a block diagram illustrating a computing device that generates a virtual display in accordance with one example set forth in the disclosure.

FIG. 8 illustrates an embodiment of a computing system 800 that uses the graphics driver 115 and GPU 104 as described herein. In general, the computing system 800 is embodied as any of a number of different types of devices, including but not limited to a laptop or desktop computer, mobile device, or other device and the CPU, GPU and memory may be system on-chip, integrated circuits, multi-package device etc. In this example, the computing system 800 includes a number of components that communicate with each other through a bus 112. In computing system 800, each of the components is capable of communicating with any of the other components either directly through the bus 112, or via one or more of the other components. The components in computing system 800 in some implementations are contained within a single physical enclosure, such as a laptop or desktop chassis, or a mobile phone casing or in some implementations the display is remote from a system on-chip or other configuration. In alternative embodiments, some of the components of computing system 800 are embodied as peripheral devices such that the entire computing system 800 does not reside within a single physical enclosure.

In some implementations, the computing system 800 also includes user interface devices for receiving information from or providing information to a user. Specifically, the computing system 800 includes an input device 108, such as a keyboard, mouse, touch-screen, or other device for receiving information from the user. The computing system 800 displays information to the user via a single physical monitor 110, such as light-emitting diode (LED) display, liquid crystal display, or other output device. However, such devices need not be employed.

In certain implementations, computing system 800 additionally includes a network adapter 807 for transmitting and receiving data over a wired or wireless network. Computing system 800 also includes one or more peripheral devices 808. The peripheral devices 808 may include mass storage devices, location detection devices, sensors, input devices, or other types of devices used by the computing system 800.

Computing system 800 includes a processing unit 102. The processing unit 102 receives and executes instructions that are stored in a memory system 106. In one embodiment, the processing unit 102 includes multiple processing cores that reside on a common integrated circuit substrate. Memory system 106 includes memory devices used by the computing system 800, such as random-access memory (RAM) modules, read-only memory (ROM) modules, hard disks, and other non-transitory computer-readable media. Some of the memory devices are used as memory 106 for the processing unit 102.

Some embodiments of computing system 800 may include fewer or more components than the embodiment as illustrated in FIG. 8. For example, certain embodiments are implemented without any display 110 or input devices 108. Other embodiments have more than one of a particular component, for example, an embodiment of computing system 800 could have multiple processing units 102, buses 112, network adapters 807, memory systems 106, etc.

In some implementations, an apparatus for providing a picture-in-picture overlay on a single monitor includes memory including stored executable instructions that define an operating system and a graphics driver, at least one processor, in operative communication with the memory, configured to execute the stored instruction defining the operating system and the graphics driver, a graphics processor, in operative communication with the memory and the processor, the processor when executing the graphics driver causes the graphics driver to display a first primary swap chain of the single physical monitor, report to an operating system (OS), a display level request for a fake connection to a non-existent second monitor, and displays on the single physical monitor a virtual display defined by a second swap chain of the non-existent second monitor, as a PIP overlay window on the displayed content of the first primary swap chain on the single physical monitor.

In certain examples, the apparatus includes a first display controller configured to output the first primary swap chain for display on the single monitor, and a second display controller configured to output the second primary swap chain for display on the single monitor. In some implementations, both display controllers allow a PIP window to be generated by either display controller.

In some examples, the graphics driver is operative to create the virtual display by reporting the display level request for the fake connection to the non-existent second monitor in response to receiving input to create the virtual display, receiving emulated display configuration requests from the OS for the non-existent second monitor in response to the display level request for the fake connection, providing emulated display configuration information regarding the non-existent second monitor to the operating system for creation of the second swap chain by the driver, and receiving, such as by the graphics driver, a request to create the second swap chain from the OS for the virtual display.

In certain examples, the graphics driver is operative to provide a live view of entire content of the second primary swap chain for the non-existent monitor as a scaled down overlay window on top of content displayed from the first primary swap chain of the single physical monitor.

In some examples, the graphics driver is operative to dynamically switch, without knowledge of the OS, content between the first primary swap chain and the second primary swap chain, based on user input. In certain examples, the graphics driver is operative to intercept display level primary surface flipping instructions from the operating system for the non-existent second monitor and emulate responses to the surface switching instructions. In some examples, the graphics driver is operative to provide an emulated vertical synchronization interrupt in response to a detected scanout of the second primary swap chain to the single physical monitor.

In certain examples, the graphics driver is operative to provide a user interface comprising one or more selectable user controls that allow at least one of: enablement of the virtual display PIP overlay window, transparency level changes of the PIP overlay window and switching of content between the first and second primary swap chains.

In some implementations, a non-transitory storage medium stores executable instructions that when executed by one or more processors causes the one or more processors to operate as a graphics driver that displays a first swap chain of a single physical monitor, reports to an operating system (OS), a display level request for a fake connection to a non-existent second monitor, and displays on the single physical monitor a virtual display defined by a second primary swap chain of the non-existent second monitor, as a PIP overlay window on the displayed content of the first primary swap chain on the single physical monitor.

In certain examples, the non-transitory storage medium includes stored executable instructions that when executed by one or more processors causes the one or more processors to operate as a graphics driver that reports the display level request for the fake connection to the non-existent second monitor in response to receiving input to create the virtual display, receives emulated display configuration requests from the OS for the non-existent second monitor in response to the display level request for the fake connection, provides emulated display configuration information regarding the non-existent second monitor to the operating system for creation of the second primary swap chain by the driver, and receives the second primary swap chain from the OS for the virtual display on the single physical monitor.

In some examples, the non-transitory storage medium includes stored executable instructions that when executed by one or more processors causes the one or more processors to operate as a graphics driver that dynamically switches, without knowledge of the OS, content between the first primary swap chain and the second primary swap chain, based on user input.

In certain examples, the non-transitory storage medium includes stored executable instructions that when executed by one or more processors causes the one or more processors to operate as a graphics driver that intercepts display level primary surface flipping instructions from the operating system for the non-existent second monitor and emulate responses to the surface switching instructions.

In some examples, the non-transitory storage medium includes stored executable instructions that when executed by one or more processors causes the one or more processors to operate as graphics driver that provides a user interface that includes one or more selectable user controls that allow at least one of: enablement of the virtual display PIP overlay window, transparency level changes of the PIP overlay window and switching of content between the first and second primary swap chains.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for providing a picture-in-picture (PIP) overlay window on a single physical monitor, the method comprising:
    outputting content of a first primary swap chain for display on the single physical monitor;
    reporting to an operating system (OS), a request for a connection to a non-existent second monitor; and
    outputting content of a second primary swap chain associated with the non-existent seocnd monitor for display in an overlay window on the single physical monitor.

2. The method of claim 1 comprising creating the content of the second primary swap chain by:
    reporting the request for the connection to the non-existent second monitor in response to receiving input to create the content of the second primary swap chain;
    receiving, by a graphics driver, emulated display configuration requests from the OS for the non-existent second monitor in response to the request for the connection;
    providing, by the graphics driver, emulated display configuration information regarding the non-existent second monitor to the operating system for creation of the second primary swap chain by the graphics driver; and
    receiving, by the graphics driver, a request to create second primary swap chain from the OS for the content of the second primary swap chain.

3. The method of claim 2 wherein outputting content of the second primary swap chain comprises providing a live view of entire content of the second primary swap chain for the non-existent second monitor as a scaled down overlay window on top of content displayed from the first primary swap chain of the single physical monitor.

4. The method of claim 1 comprising dynamically switching, without knowledge of the OS, content between the first primary swap chain and the second primary swap chain, based on user input.

5. The method of claim 1 comprising:
intercepting, by a graphics driver, primary surface flipping instructions from the operating system for the non-existent second monitor and emulate responses to the primary surface flipping instructions.

6. The method of claim 5 comprising providing, by the graphics driver, an emulated vertical synchronization interrupt in response to a detected scanout of the second primary swap chain to the single physical monitor.

7. The method of claim 1 comprising providing a user interface comprising one or more selectable user controls that allow at least one of: enablement of the overlay window, transparency level changes of the overlay window and switching of content between the first and second primary swap chains.

8. An apparatus for providing a picture-in-picture overlay on a single physical monitor comprising:
memory comprising stored executable instructions that define an operating system and a graphics driver;
at least one processor, in operative communication with the memory, configured to execute at least a portion of the stored executable instructions defining the operating system and the graphics driver;
a graphics processor, in operative communication with the memory and the at least one processor,
the at least one processor when executing the operating system and the graphics driver causing the graphics driver to:
output content of a first primary swap chain of the single physical monitor;
report to the operating system (OS), a request for a connection to a non-existent second monitor; and
ouput content of a second primary swap chain associated with the non-existent second monitor for display in an overlay window on the single physical monitor.

9. The apparatus of claim 8 comprising:
a first display controller configured to output the first primary swap chain for display on the single physical monitor; and
a second display controller configured to output the second primary swap chain for display on the single physical monitor.

10. The apparatus of claim 9 wherein the graphics driver is operative to create a virtual display by:
reporting the request for the connection to the non-existent second monitor in response to receiving input to create the content of the second primary swap chain;
receiving emulated display configuration requests from the OS for the non-existent second monitor in response to the request for the connection;
providing emulated display configuration information regarding the non-existent second monitor to the operating system for creation of the second primary swap chain by the graphics driver; and
receiving, by the graphics driver, a request to create second primary swap chain from the OS for the content of the second primary swap chain.

11. The apparatus of claim 10 wherein the graphics driver is operative to provide a live view of entire content of the second primary swap chain for the non-existent second monitor as a scaled down overlay window on top of content displayed from the first primary swap chain of the single physical monitor.

12. The apparatus of claim 8 wherein the graphics driver is operative to dynamically switch, without knowledge of the OS, content between the first primary swap chain and the second primary swap chain, based on user input.

13. The apparatus of claim 8 wherein the graphics driver is operative to intercept primary surface flipping instructions from the operating system for the non-existent second monitor and emulate responses to the primary surface flipping instructions.

14. The apparatus of claim 13 wherein the graphics driver is operative to provide an emulated vertical synchronization interrupt in response to a detected scanout of the second primary swap chain to the single physical monitor.

15. The apparatus of claim 8 wherein the graphics driver is operative to provide a user interface comprising one or more selectable user controls that allow at least one of: enablement of the overlay window, transparency level changes of the overlay window and switching of content between the first and second primary swap chains.

16. A non-transitory storage medium comprising stored executable instructions that when executed by one or more processors causes the one or more processors to operate as a graphics driver that:
outputs content of a first primary swap chain for a single physical monitor;
reports to an operating system (OS), a request for a connection to a non-existent second monitor; and
outputs content of a second primary swap chain associated with the non-existent second monitor for display in an overlay window on the single physical monitor.

17. The non-transitory storage medium of claim 16 comprising stored executable instructions that when executed by one or more processors causes the one or more processors to operate as a graphics driver that:
reports the request for the connection to the non-existent second monitor in response to receiving input to create the content of the second primary swap chain;
receives emulated display configuration requests from the OS for the non-existent second monitor in response to the request for the connection;
provides emulated display configuration information regarding the non-existent second monitor to the operating system for creation of the second primary swap chain by the graphics driver; and
receives a request to create the second primary swap chain from the OS for the content of the second primary swap chain.

18. The non-transitory storage medium of claim 16 comprising stored executable instructions that when executed by one or more processors causes the one or more processors to operate as a graphics driver that dynamically switches, without knowledge of the OS, content between the first primary swap chain and the second primary swap chain, based on user input.

19. The non-transitory storage medium of claim 16 comprising stored executable instructions that when executed by one or more processors causes the one or more processors to operate as a graphics driver that intercepts primary surface flipping instructions from the operating system for the non-existent second monitor and emulate responses to the primary surface flipping instructions.

20. The non-transitory storage medium of claim 16 comprising stored executable instructions that when executed by one or more processors causes the one or more processors to operate as graphics driver that provides a user interface comprising one or more selectable user controls that allow at least one of: enablement of the overlay window, transparency level changes of the overlay window and switching of content between the first and second primary swap chains.

* * * * *